United States Patent
Strong

(10) Patent No.: US 8,449,173 B1
(45) Date of Patent: May 28, 2013

(54) METHOD AND SYSTEM FOR THERMAL TESTING OF COMPUTING SYSTEM COMPONENTS

(75) Inventor: Jasmine Strong, San Francisco, CA (US)

(73) Assignee: Google Inc., Mountain View, CA (US)

(*) Notice: Subject to any disclaimer, the term of this patent is extended or adjusted under 35 U.S.C. 154(b) by 879 days.

(21) Appl. No.: 12/114,974

(22) Filed: May 5, 2008

Related U.S. Application Data

(60) Provisional application No. 61/043,965, filed on Apr. 10, 2008.

(51) Int. Cl.
*G01R 31/00* (2006.01)
*G01D 18/00* (2006.01)

(52) U.S. Cl.
USPC ...... 374/1; 374/4; 374/57; 374/152; 374/178; 324/500; 702/99; 702/85

(58) Field of Classification Search
USPC .................. 374/1, 2, 141, 170–173, 178, 29, 374/137, 4, 152; 702/85, 99, 108, 127, 130; 324/500, 601, 512, 527, 762.01, 763.01, 324/764.01; 327/512, 513; 713/300; 716/136
See application file for complete search history.

(56) References Cited

U.S. PATENT DOCUMENTS

| | | | | |
|---|---|---|---|---|
| 5,287,294 A | * | 2/1994 | Baert et al. | 702/99 |
| 5,440,305 A | * | 8/1995 | Signore et al. | 341/120 |
| 5,519,644 A | * | 5/1996 | Benton | 702/88 |
| 5,703,342 A | * | 12/1997 | Hoffmann et al. | 219/497 |
| 5,857,777 A | * | 1/1999 | Schuh | 374/172 |
| 6,145,098 A | * | 11/2000 | Nouri et al. | 714/31 |
| 6,286,992 B1 | * | 9/2001 | Kyrtsos | 374/45 |
| 6,814,485 B2 | * | 11/2004 | Gauthier et al. | 374/170 |
| 6,879,928 B2 | * | 4/2005 | Clabes et al. | 702/130 |
| 6,934,652 B2 | * | 8/2005 | Gauthier et al. | 702/99 |
| 6,957,163 B2 | * | 10/2005 | Ando | 702/130 |
| 6,996,491 B2 | * | 2/2006 | Gold et al. | 702/132 |
| 7,052,180 B2 | * | 5/2006 | Shih | 374/178 |
| 7,102,417 B2 | * | 9/2006 | Gordon et al. | 327/512 |
| 7,121,721 B2 | * | 10/2006 | Hauenstein et al. | 374/178 |
| 7,536,426 B2 | * | 5/2009 | Chen et al. | 1/1 |
| 7,552,364 B2 | * | 6/2009 | Johnson et al. | 714/47.2 |
| 8,037,445 B2 | * | 10/2011 | Poirier et al. | 716/136 |
| 2003/0158683 A1 | * | 8/2003 | Gauthier et al. | 702/99 |
| 2004/0267486 A1 | * | 12/2004 | Percer et al. | 702/120 |
| 2005/0216220 A1 | * | 9/2005 | Kim | 702/130 |
| 2006/0071683 A1 | * | 4/2006 | Best et al. | 326/30 |
| 2006/0161373 A1 | * | 7/2006 | Mangrulkar et al. | 702/130 |
| 2006/0178852 A1 | * | 8/2006 | Johns et al. | 702/130 |
| 2006/0267668 A1 | * | 11/2006 | Porter | 327/512 |

(Continued)

FOREIGN PATENT DOCUMENTS

JP 63128276 A * 5/1988
JP 2001298160 A * 10/2001

*Primary Examiner* — Gail Verbitsky
(74) *Attorney, Agent, or Firm* — Foley and Lardner, LLP; John D. Lanza

(57) ABSTRACT

Some embodiments provide a system that tests a computing system. During operation, the system monitors a temperature of a component in the computing system while running a series of calibrated workloads on the component. Next, the system analyzes a fluctuation of the temperature resulting from the calibrated workloads to determine a thermal performance of the component. The system then uses the determined thermal performance to improve the reliability of the computing system.

15 Claims, 3 Drawing Sheets

U.S. PATENT DOCUMENTS

2007/0189355 A1* 8/2007 Lorenz ............................... 374/1
2007/0204175 A1* 8/2007 Henson et al. ................. 713/300
2007/0216468 A1* 9/2007 Duarte ......................... 327/513
2009/0204358 A1* 8/2009 Kobayashi et al. ........... 702/130
2009/0259425 A1* 10/2009 Ku et al. ....................... 702/104
2009/0273361 A1* 11/2009 Batra et al. ..................... 326/16

* cited by examiner

METHOD AND SYSTEM FOR THERMAL TESTING OF COMPUTING SYSTEM COMPONENTS

RELATED APPLICATION

This application claims priority under 35 U.S.C. section 119(e) to U.S. Provisional Application Ser. No. 61/043,965, entitled "Method and System for Thermal Testing of Computing System Components," by inventor Jasmine Strong filed on 10 Apr. 2008.

BACKGROUND

Related Art

Embodiments relate to thermal testing of computing system components.

As predicted by Moore's Law, integrated circuit (IC) performance continues to increase at an exponential rate. However, these performance improvements have given rise to problems with power consumption and heat dissipation. This has created a demand for cooling systems that can dissipate the large amounts of heat generated by modern ICs. The resulting improvements in cooling technology have allowed such cooling systems to keep up with ICs, albeit at an added cost and with a number of undesirable consequences.

In particular, a combination of heat sinks, fans, and air conditioning are commonly used to cool machines in a data center. Furthermore, design decisions tend to overutilize or underutilize each cooling resource. For example, material costs for large heat sinks may be unnecessary if smaller heat sinks are adequate for cooling a certain type of processor. On the other hand, inadequate heat sinks may require the ambient temperature in the data center to be lowered, thus incurring costs associated with elevated use of air conditioning.

The thermal performance of each machine may also degrade over time. For example, dust may accumulate on fans and heat sinks and fan speeds may slow, resulting in impeded air flow and reduced heat sink and fan performance. Similarly, the thermal interface material (TIM) between a semiconductor and heat sink may conduct heat less effectively if the TIM is overheated. The heat sink mount may also loosen from fan vibrations or transport of the machine. Thus, older machines may be more prone to throttling of components, reboots, glitches, and/or crashes from overheated components, which in turn may result in reduced reliability and usability of the machines.

SUMMARY

Some embodiments provide a system that tests a computing system. During operation, the system monitors a temperature of a component in the computing system while running a series of calibrated workloads on the component. Next, the system analyzes a fluctuation of the temperature resulting from the calibrated workloads to determine a thermal performance of the component, which is used to improve the reliability of the computing system.

In some embodiments, the system also records the monitored temperature into a bootlog and then obtains a system log that includes historical data from the computing system. Next, the system updates the system log using the bootlog. Finally, the system uses the historical data to further determine the thermal performance of the component.

In some embodiments, the system log is updated upon loading an operating system of the computing system.

In some embodiments, the system also boots the computing system and loads firmware on the computing system to monitor the temperature and run the calibrated workloads.

In some embodiments, the thermal performance is used to determine an aging process of the computing system, change an environment of the computing system, change an operation of the computing system, reconfigure the computing system, service the computing system, and/or predict a failure of the computing system.

In some embodiments, the component may be a processor, a memory, a port, a storage device, or a semiconductor device.

In some embodiments, analyzing the fluctuation of the temperature involves at least one of determining a gradient of the fluctuation and determining a range of the fluctuation.

In some embodiments, the thermal performance of the component is determined by comparing the fluctuation in temperature with an expected fluctuation for each of the calibrated workloads.

In some embodiments, running the calibrated workloads involves pausing between calibrated workloads.

In some embodiments, an indicator of the thermal performance is displayed using at least one of a console of the computing system and a set of indicator lights on the computing system.

DETAILED DESCRIPTION

Figure 1:
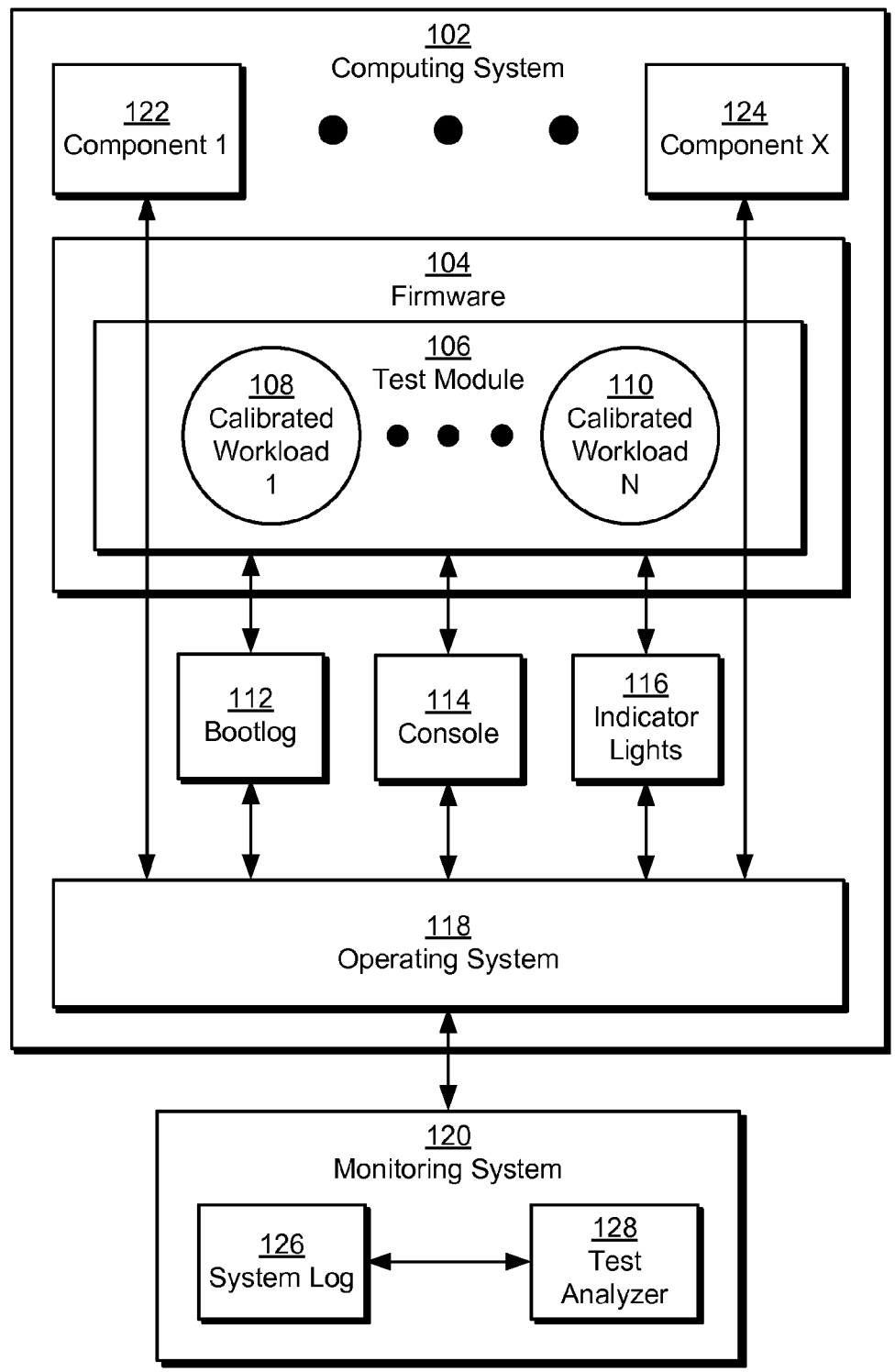
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the embodiments. Thus, the various embodiments are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for thermal testing of a computing system. The computing system may be a personal computer (PC), workstation, server, and/or supercomputer. The computing system may also include components such as processors, memory, ports, storage devices, and/or other semiconductor devices. Thermal testing of the computing system may thus involve thermal testing of individual components within the computing system.

More specifically, embodiments provide a method and system for determining the thermal performance of a component in the computing system. The component may be tested by monitoring the temperature of the component while a series of calibrated workloads is run on the component. Fluctuations in the temperature resulting from the calibrated workloads may then be analyzed to determine the component's thermal performance. In one or more embodiments, the component's thermal performance is determined by comparing the component's fluctuation in temperature with an expected fluctuation for each of the calibrated workloads. The thermal performance may then be used to determine an aging process of the computing system, change an environment of the computing system, change an operation of the computing system, reconfigure the computing system, service the computing system, and/or predict a failure of the computing system.

FIG. 1 shows a schematic of a system in accordance with an embodiment. As shown in FIG. 1, the system includes a computing system 102 and a monitoring system 120. Computing system 102 includes a set of components (e.g., component 1 122, component x 124), firmware 104, a bootlog 112, a console 114, a set of indicator lights 116, and an operating system 118. In addition, monitoring system 120 includes a system log 126 and a test analyzer 128. Each of these components is described in further detail below.

Computing system 102 may correspond to an electronic system with one or more hardware components (e.g., component 1 122, component x 124), such as processors, memory, ports, storage devices, and/or other semiconductor devices. For example, computing system 102 may be a personal computer (PC), workstation, server, and/or supercomputer.

In addition, the transmission of electric signals between the components allows computing system 102 to perform tasks, such as booting, running applications, reading from and writing to storage devices, and/or transmitting data over a network connection. In one or more embodiments, these tasks are coordinated by software on computing system 102, such as firmware 104 and operating system 118. For example, computing system 102 may be booted by firmware 104, which initializes one or more components (e.g., component 1 122, component x 124) on computing system 102 and loads operating system 118. Operating system 118 may then execute one or more applications, process workloads, and/or execute other tasks using the components.

Those skilled in the art will appreciate that the components on computing system 102 may generate large amounts of heat during operation. Furthermore, the amount of heat generated by a component may be based on the amount of work processed by the component. For example, an idling processor may generate a minimal amount of heat, while an overclocked processor may malfunction from overheating. As a result, dissipation of heat generated by components on computing system 102 may be required to maintain proper functioning of the components.

To dissipate heat, computing system 102 may include one or more cooling systems (not shown). Each cooling system may be responsible for removing heat from one or more components. For example, heat from a processor may be dissipated using a heat sink mounted to the processor, a thermal interface material (TIM) that conducts heat from the heat sink to the processor, and/or a fan that removes heated air from the processor's surroundings. The environment around computing system 102 may additionally contribute to controlling heat in the components. For example, computing system 102 may reside in an air-conditioned environment that allows the fans to move cool ambient air over hot components.

In other words, the temperature of each component may vary based on the component's cooling system, the environment around computing system 102, and/or the workload assigned to the component. Furthermore, changes in the cooling system and environment may affect the thermal resistance of the component, and consequently, the temperature and performance of the component. In particular, the component may overheat if the component is inadequately cooled while processing a workload. On the other hand, the component may not be maximally utilized if the cooling system and/or surrounding environment are capable of dissipating heat from larger workloads than the component is currently configured to receive. Accordingly, an imbalance may exist between the throughput of the component and the amount of cooling used to dissipate heat resulting from the throughput.

In one or more embodiments, computing system 102 includes functionality to monitor the thermal performance of the components. More specifically, a test module 106 within firmware 104 may perform thermal testing on the components. In addition, the thermal testing may be used to improve the reliability of computing system 102, as explained below.

In one or more embodiments, test module 106 executes a thermal test of the components upon booting of computing system 102 by firmware 104. In other words, test module 106 may begin thermal testing once the components are initialized and system voltages and temperatures are determined to be within specification by firmware 104. More specifically, test module 106 may check that the starting temperature of one or more components is within bounds to prevent overheating of the component(s) during the thermal test and to increase the accuracy of the thermal test.

To thermally test a component, test module 106 may monitor a temperature of the component using a temperature sensor in the component. In addition, test module 106 may run a series of calibrated workloads (e.g., calibrated workload 1 108, calibrated workload n 110) on the component as the component's temperature is monitored. The calibrated workloads may include a set of instructions to be executed by the component, such as processor instructions for calculating mathematical sequences (e.g., sequences of prime numbers, Fibonacci sequence, etc.) and/or a series of reads and writes on a hard disk drive.

In one or more embodiments, fluctuations in the component's temperature resulting from the calibrated workloads are analyzed to determine the thermal performance of the component. In one or more embodiments, the thermal performance of the component is proportional to the thermal resistance of the component, which may be determined by measuring the rise in the component's temperature as a specific amount of power is dissipated by the component with each calibrated workload.

For example, a processor and heat sink assembly may experience a rise of ten degrees Celsius as the processor dissipates ten watts of heat from running a calibrated workload, resulting in a thermal resistance of one degree Celsius per watt. Similarly, a second processor and heat sink assembly may experience a rise of five degrees Celsius when an equivalent amount of power is dissipated, resulting in a thermal resistance of 0.5 degrees Celsius per watt. Consequently, the second processor and heat sink assembly may experience better thermal performance than the first processor and heat sink assembly because the second processor and heat sink assembly have a lower thermal resistance.

In one or more embodiments, the thermal performance of the component is determined by comparing the measured temperature fluctuations with expected fluctuations for each of the calibrated workloads. In other words, the expected fluctuations may represent temperature fluctuations from a normally functioning component and cooling system (e.g., processor and heat sink assembly). Deviations from the expected fluctuations may indicate a faulty component and/or cooling system. For example, a faulty component and/or cooling system may experience a much higher rise in temperature during a calibrated workload than a normally functioning component and cooling system.

Furthermore, test module 106 may include pauses between calibrated workloads. In one or more embodiments, the pauses allow the rate of cooling for the component and/or cooling system to be measured after heat is applied from the calibrated workload. For example, each calibrated workload may be followed by a 15 second pause that allows the component to cool from the calibrated workload. As a result, the component's temperature may rise as a calibrated workload is run on the component and fall as test module 106 pauses before the next calibrated workload. Thus, the temperature fluctuations of the component may occur as the component alternates between periods of calibrated workload processing and rest. Analysis of temperature fluctuations may additionally include determining gradients and/or ranges of the fluctuations, as explained below with respect to FIG. 2.

Once the thermal performance of the component is assessed, the thermal performance may be used for a variety of purposes. More specifically, the thermal performance may be used to determine an aging process of computing system 102, change an environment of computing system 102, change an operation of computing system 102, reconfigure computing system 102, service computing system 102, and/or predict a failure of computing system 102. For example, a processor may be monitored periodically by test module 106 to detect potential failures in the processor. If the processor is found to be overheating and/or in danger of overheating, computing system 102 may be assigned smaller workloads to reduce the amount of thermal power dissipated by the processor. Computing system 102 may also be serviced to remove dust from the processor's heat sink assembly, reapply the TIM between the processor and heat sink, and/or otherwise improve the thermal performance of the processor. The ambient temperature around the processor may also be cooled by increasing the amount of air conditioning in the vicinity of computing system 102. Finally, computing system 102 may be reconfigured to add a larger heat sink and/or more powerful fan to the processor if the thermal testing indicates a need for such modifications.

Those skilled in the art will appreciate that thermal testing may be carried out on the components in a variety of orders. For example, the components may be tested one at a time. Once a component has finished testing, test module 106 may proceed to the next component until thermal testing of all components has completed. Alternatively, groups of some or all of the components may be tested at the same time. For example, a bootstrap processor on computing system 102 may first be tested as computing system 102 boots. Next, processor (e.g., CPU) packages, which may include one or more dies and/or one or more cores, may be tested one at a time. Other components, such as memory, disk drives, and/or ports may also be tested individually, in groups, and/or all at once.

Data collected from a thermal test may also be logged for future reference and analysis. In one or more embodiments, monitored temperatures from a component's thermal test are stored in bootlog 112 by test module 106. As mentioned previously, test module 106 may execute as computing system 102 boots. Once operating system 118 is loaded by firmware 104, operating system 118 may send the contents of bootlog 112 to monitoring system 120, which is external to computing system 102. For example, operating system 118 may transmit bootlog 112 to monitoring system 120 over a network connection.

In one or more embodiments, temperature measurements from bootlog 112 may be analyzed by test analyzer 128 in monitoring system 120 to determine the thermal performance of the components within computing system 102. Thus, a component's thermal performance may not be established until operating system 118 has booted and bootlog 112 is transmitted to monitoring system 120 by operating system 118. Alternatively, analysis of monitored temperatures may be performed by test module 106, operating system 118, an application on computing system 102, and/or another computing system connected to computing system 102 over a network connection.

In one or more embodiments, system log 126 in monitoring system 120 includes historical data from computing system 102. In other words, system log 126 may include data collected from previous thermal tests and/or other tests of computing system 102. For example, system log 126 may include monitored temperatures from previous thermal tests of the computing system, data and results from other tests of the computing system, records of the computing system's failures and glitches, and/or other data associated with the computing system's behavior. Monitoring system 120 may update system log 126 with bootlog 112 once bootlog 112 is received from operating system 118.

Test analyzer 128 may also use historical data in system log 126 to further ascertain the thermal performance of the component. For example, system log 126 may include data collected from a variety of sensors on computing system 102. System log 126 may also include records of failures experienced by computing system 102. Test analyzer 128 may then use the sensor data and/or failure records as additional factors in assessing a component's likelihood of failure.

Furthermore, indicators of the component's thermal performance may be displayed on console 114 and/or indicator lights 116. In one or more embodiments, console 114 corresponds to a visual output device of computing system 102, such as a display screen and/or terminal. As a result, console 114 may display a variety of information, including temperature data collected by test module 106, the status of thermal tests run by test module 106, and/or the results and analysis of the thermal tests as determined by test analyzer 128, test module 106, and/or other analysis mechanisms.

Similarly, indicator lights 116 may flash when a failure or imminent failure is detected. For example, each failure or potential failure detected by test module 106, operating system 118, and/or test analyzer 128 may be associated with an error code that is represented using a series of flashes. If a failure or potential failure is found, indicator lights 116 may flash the associated error code to an administrator, technician, and/or user of computing system 102. Consequently, monitoring of computing system 102 and/or detection and prevention of failures in computing system 102 may be facilitated by the transmission of bootlog 112 to monitoring system 120, the use of system log 126 in assessing the state of computing system 102, and/or the display of status information using console 114 and/or indicator lights 116.

Figure 2:
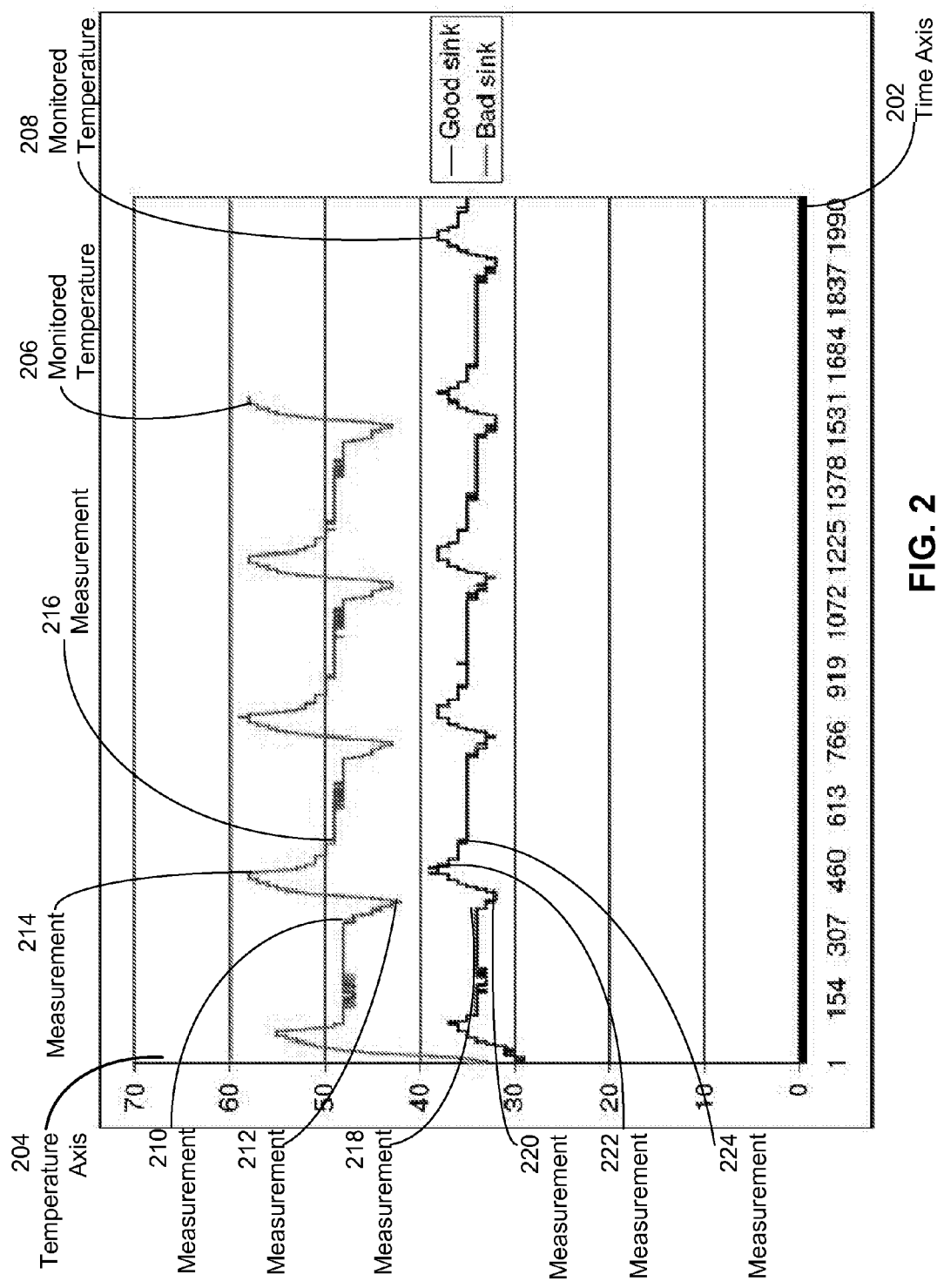
FIG. 2 shows a set of temperature measurements from a thermal test in accordance with an embodiment.

FIG. 2 shows a set of temperature measurements from a thermal test in accordance with an embodiment. As described above, the thermal test may be performed on one or more components of a computing system, such as computing system 102 of FIG. 1. Furthermore, the thermal test may be used to determine the thermal performance of the component(s). As shown in FIG. 2, the temperature measurements are displayed on a graph with a time axis 202 and a temperature axis 204. The graph further includes two monitored temperatures 206-208 from two different components. Each monitored temperature 206-208 includes a set of measurements 210-224 corresponding to the component's temperature at a specific time during the thermal test.

In one or more embodiments, monitored temperature 206 corresponds to a component with a faulty cooling system (e.g., a bad heat sink), whereas monitored temperature 208 corresponds to a component with a normally functioning cooling system (e.g., a good heat sink). Both monitored temperatures 206-208 include a series of fluctuations and/or oscillations resulting from the execution of a series of calibrated workloads and pauses on the components during the test. For example, fluctuations in monitored temperature 206 may indicate that the time between measurement 210 and measurement 212 corresponds to a pause, the time between measurement 212 and measurement 214 corresponds to a calibrated workload, and the time between measurement 214 and measurement 216 corresponds to another pause. Similar fluctuations in monitored temperature 206 may indicate that a calibrated workload occurred between measurement 220 and measurement 222 and that pauses occurred between measurement 218 and measurement 220, as well as between measurement 222 and measurement 224.

However, measurements 210-216 for monitored temperature 206 and measurements 218-224 for monitored temperature 208 reveal different patterns in temperature fluctuations for the two components. In particular, measurements 210-216 are all higher than measurements 218-224. Furthermore, gradients and ranges of temperature fluctuations between measurements 210-216 are greater than gradients and ranges of temperature fluctuations between measurements 218-224. For example, during the same calibrated workload, the rise in temperature between measurement 212 and measurement 214 is approximately 15 degrees, while the rise in temperature between measurement 220 and measurement 222 is approximately five degrees. Since measurements 212-214 and measurements 220-224 take place over the same span of time, the heating gradient of measurements 212-214 is also steeper than the heating gradient of measurements 220-222.

Along the same lines, while measurements 214-216 and measurements 222-224 both correspond to cooling of the component during a pause after the same calibrated workload, measurements 214-216 exhibit a larger range of temperatures and steeper cooling gradients than measurements 222-224. As shown in FIG. 2, monitored temperature 206 drops approximately ten degrees between measurement 214 and measurement 216, while monitored temperature 208 drops less than five degrees between measurement 222 and measurement 224. In other words, monitored temperature 206 fluctuates more than monitored temperature 208 when the same calibrated workload is run on the two components. As a result, monitored temperature 208 may conform to expected fluctuations for a normally operating component and cooling system, whereas monitored temperature 206 may not. Moreover, the thermal performance of each component is not affected by the ambient temperature during the thermal test because ranges and gradients of temperature fluctuations are used to evaluate each component's thermal performance rather than absolute temperature measurements.

Figure 3:
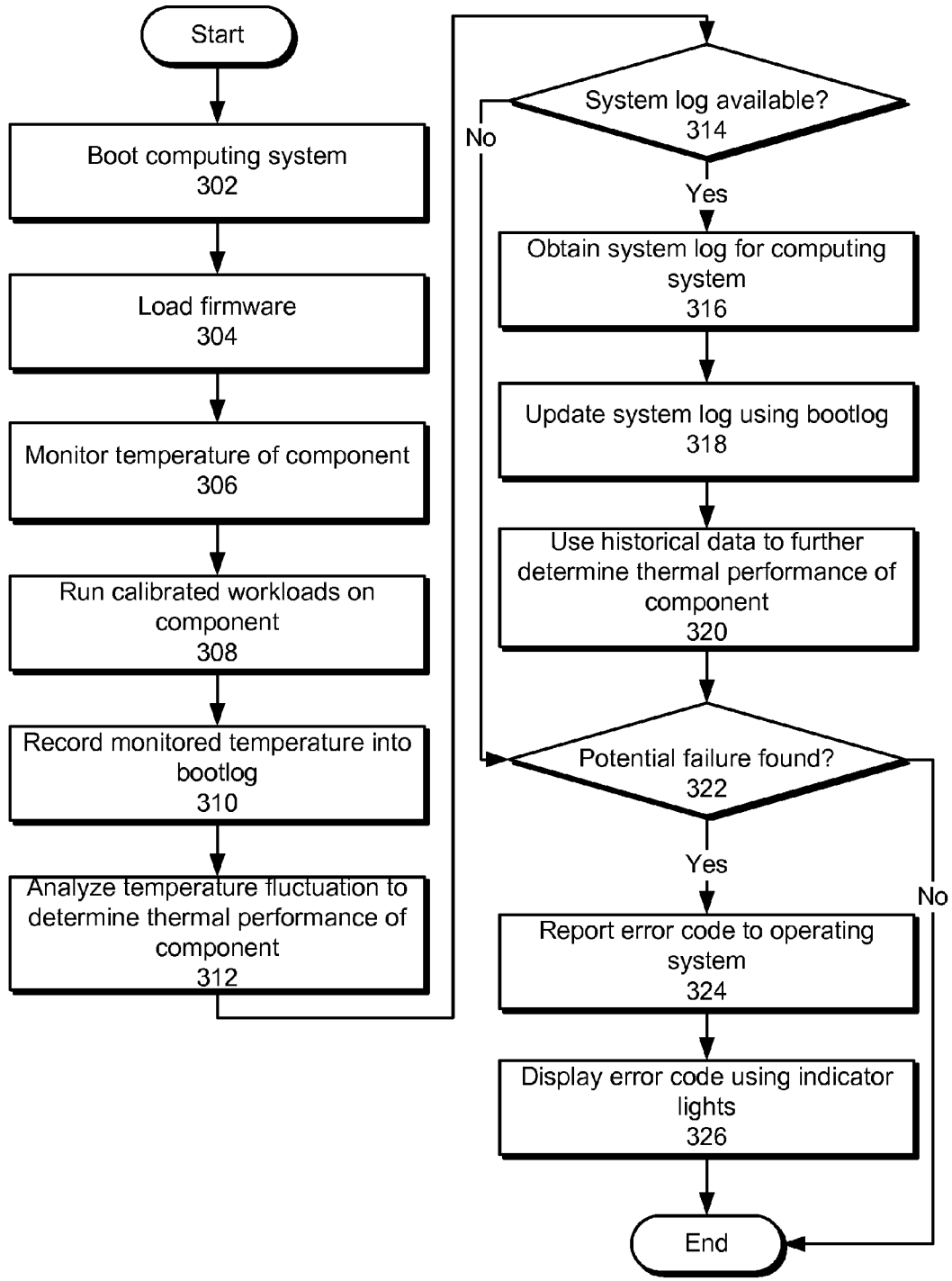
FIG. 3 shows a flowchart illustrating the process of running a thermal test on a computing system in accordance with an embodiment.

FIG. 3 shows a flowchart illustrating the process of running a thermal test on a computing system. In one or more embodiments, one or more of the steps may be omitted, repeated, and/or performed in a different order. Accordingly, the specific arrangement of steps shown in FIG. 3 should not be construed as limiting the scope of the embodiments.

First, the computing system is booted (operation 302). As part of the booting process, firmware in the computing system is loaded (operation 304). Furthermore, the firmware may perform the thermal test during the boot. To thermally test the computing system, the firmware monitors the temperature of a component in the computing system (operation 306), which may be accomplished using a temperature sensor in the component. As the component's temperature is monitored, a series of calibrated workloads is run on the component (operation 308). Each calibrated workload may deliver a specific amount of power to the component. Furthermore, the amount of power dissipated by the component during the calibrated workloads may be the same or different. For example, the calibrated workloads may all dissipate five watts of power, or a series of three calibrated workloads may dissipate three, six, and nine watts of power, respectively.

Once the calibrated workloads have run, the monitored temperature is recorded into a bootlog (operation 310) on the computing system. Fluctuations in the monitored temperature may then be analyzed to determine the thermal performance of the component (operation 312). As described above, the thermal performance of the component may be based on gradients and ranges of the temperature fluctuations. The fluctuations, gradients, and ranges may also be compared with expected fluctuations, gradients, and ranges for a normally operating component.

Assessment of the component's thermal performance may also be supplemented by a system log of the computing system (operation 314), which contains historical data from the computing system. For example, the system log may include monitored temperatures from previous thermal tests of the computing system, data and results from other tests of the computing system, records of the computing system's failures and glitches, and/or other data associated with the computing system's behavior. If a system log is available, the system log is obtained (operation 316) and updated using the bootlog (operation 318). In addition, the historical data from the system log is used to further determine the component's thermal performance (operation 320). If the system log is not available, the thermal performance of the component is based solely on the thermal test run in operations 306-312.

If the temperature fluctuations are out of line with expected fluctuations, a potential failure of the component may be found (operation 322). In other words, the component may overheat and cause a failure if the component is used further. If a potential failure is found, an error code associated with the potential failure is displayed using indicator lights on the computing system (operation 324). The indicator lights may display, for example, an identifier for the component, a cause of the potential failure, and/or a severity of the potential failure. Status information from the thermal test may also be displayed on a console of the computing system, as described above. Furthermore, the computing system may be shut down, serviced, and/or otherwise altered to prevent the potential failure from happening. If no potential failures are found, the computing system may continue booting and resume normal operation.

The test may be repeated on remaining components of the computing system. As mentioned previously, the components may be tested one at a time, in groups, or all at once. Potential failures may be discovered as the components are tested, or after the operating system on the computing system has booted and transmitted the bootlog to a monitoring system, as discussed above with respect to FIG. 1. Furthermore, the thermal performance of each component may be used to determine an aging process of the computing system, change an environment of the computing system, change an operation of the computing system, reconfigure the computing system, service the computing system, and/or predict a failure of the computing system.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for testing a computing system, comprising:
    monitoring a temperature of a component in the computing system;
    running a series of calibrated workloads on the component, wherein each calibrated workload delivers a specific amount of power to the component; and
    using a monitoring system to analyze a fluctuation of the component's temperature resulting from the calibrated workloads wherein analyzing the fluctuations of temperature involves at least one of determining a gradient of the fluctuations or determining a range of the fluctuations, and
    determining whether a system log is available;
    if the system log is unavailable, the thermal performance of the component is determined based on analyzing the fluctuations of temperature by the monitoring system;
    if the system log is available, obtaining and updating the system log, wherein the available system log further comprises historical data from the computing system, the historical data comprises monitored temperatures from a previous thermal test or expected fluctuations for each of the calibrated workloads, and comparing the analyzed fluctuations of the component's temperature with the expected fluctuations or with the previous thermal test to determine a thermal performance of the component.

2. The method of claim 1, further comprising:
    recording the monitored temperature of the thermal performance of the component into a bootlog; and
    updating the system log using the bootlog.

3. The method of claim 2, wherein the system log is updated upon loading an operating system of the computing system.

4. The method of claim 1, further comprising:
    booting the computing system; and
    loading firmware on the computing system for monitoring the temperature of the component in the computing system and for running the series of calibrated workloads on the component.

5. The method of claim 1, wherein the thermal performance of the component is used to:
    determine an aging process of the computing system;
    change an environment of the computing system;
    change an operation of the computing system;
    reconfigure the computing system;
    service the computing system; or
    predict a failure of the computing system.

6. The method of claim 1, wherein the component is at least one of:
    a processor;
    a memory;
    a port;
    a storage device; and
    a semiconductor device.

7. The method of claim 1, wherein running the calibrated workloads involves pausing on the component between calibrated workloads.

8. The method of claim 1, wherein an indicator of potential failure of the component due to the thermal performance is displayed using at least one of:
    a console of the computing system; and
    a set of indicator lights on the computing system.

9. A system for testing a computing system, comprising:
    firmware of the computing system, comprising:
        a test module configured to:
            monitor a temperature of a component in the computing system; and
            run a series of calibrated workloads on the component, wherein running each calibrated workload on the component comprises delivering a specific amount of power to the component and causes the component to perform one or more corresponding operations;
        an operating system of the computing system, wherein the operating system is configured to send a bootlog of the monitored temperature to a monitoring system or to receive an error code based on thermal performance of the component; and
        the monitoring system, comprising:
            a test analyzer configured to analyze a fluctuation of the temperature resulting from the calibrated workloads to determine a thermal performance of the component wherein analyzing the fluctuation of the temperature involves at least one of determining a gradient of the fluctuation and determining a range of the fluctuation; and
            a system log updated by the bootlog, wherein the system log comprises monitored temperatures from a previous thermal test or expected fluctuations for each of the calibrated workloads, and comparing the analyzed fluctuations of the component's temperature with the expected fluctuations to determine a thermal performance of the component.

10. The system of claim 9, wherein the system log is updated upon loading the operating system.

11. The system of claim 9, wherein the test module is further configured to run upon booting the computing system.

12. The system of claim 9, wherein the thermal performance of the component is used to:
    determine an aging process of the computing system;
    change an environment of the computing system;
    change an operation of the computing system;
    reconfigure the computing system;
    service the computing system; or
    predict a failure of the computing system.

13. The system of claim 9, wherein the component is at least one of:
a processor;
a memory;
a port;
a storage device; and
a semiconductor device.

14. The system of claim 9, wherein the test module is further configured to pause on the component between calibrated workloads.

15. The system of claim 9, further comprising:
a console of the computing system or
a set of indicator lights on the computing system for displaying an indication of a potential failure in the component based on the thermal performance.

* * * * *